UNITED STATES PATENT OFFICE.

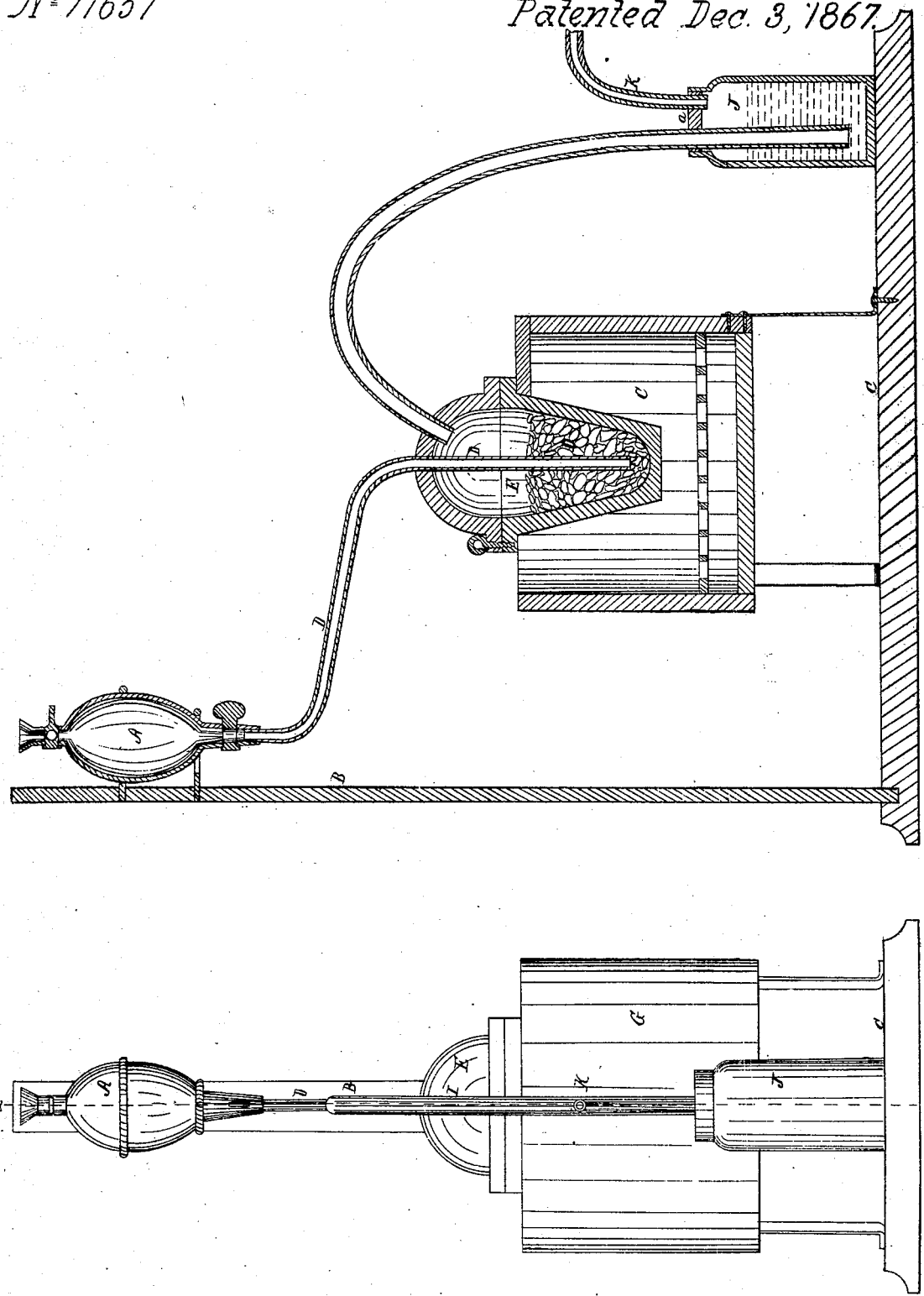

BENJAMIN R. SMITHSON, OF NEW YORK, N. Y., ASSIGNOR TO HIMSELF AND SAMUEL WEST, OF BOSTON, MASSACHUSETTS.

IMPROVED APPARATUS FOR GENERATING OXYGEN GAS.

Specification forming part of Letters Patent No. 71,657, dated December 3, 1867.

*To all whom it may concern:*

Be it known that I, BENJAMIN R. SMITHSON, of the city, county, and State of New York, have invented an Improved Apparatus for Generating Oxygen Gas, of which the following is a full, clear, and exact description, reference being had to the accompanying drawings, making part of this specification, in which—

Figure 1 is an end elevation of my improved apparatus. Fig. 2 is a longitudinal section through the center of the same, on the line $xx$ of Fig. 1.

The apparatus heretofore employed for generating oxygen gas consists of a glass retort in which the sulphuric acid is boiled, the vapor from which passes through a porcelain pipe filled with pumice-stone, the pipe being heated by means of a charcoal fire surrounding it. This apparatus is objectionable, for the reason that it is extremely difficult to boil the sulphuric acid in the glass retort on account of the intense heat required, which is liable to break the retort, while the porcelain pipe is also frequently cracked or broken by the heat of the fire through which it passes, and these difficulties have heretofore rendered the production of this gas extremely expensive.

My invention has for its object to overcome these objections, and to greatly reduce the cost of manufacturing oxygen gas; and it consists in an improved apparatus in which the sulphuric acid is introduced through a platinum pipe into a retort containing pumice-stone in a coarsely-powdered state, and kept at a red heat, by which the acid is decomposed into sulphurous acid and oxygen gas, the sulphurous acid being afterward separated by means of a suitable washing apparatus, leaving the pure oxygen gas.

To enable others skilled in the art to understand and use my invention, I will proceed to describe the manner in which I have carried it out.

In the said drawings, A is a reservoir which contains sulphuric acid, and is supported in brackets projecting from a standard, B, rising from the base C. This reservoir is provided with a stop-cock at each end, and to its lower end is fitted a pipe, D, composed of platinum, which passes through the top and extends nearly to the bottom of a retort, E, which is composed of fire-clay, and is set into a furnace, G, which is supplied with fuel through a suitable door. (Not shown in the drawings.)

The retort E contains pumice-stone H in a coarsely-powdered state, which is kept at a red heat, by which means the sulphuric acid, as it escapes from the lower end of the pipe D, is decomposed and converted into sulphurous acid in vapor and oxygen gas, which pass off together through a platinum pipe, I, to the washing apparatus, in which the sulphurous acid is separated from the oxygen gas. This apparatus consists of a vessel, J, filled with water or other liquid suitable for the purpose, and closed tightly by a cover, $a$, through which the pipe I passes, and extends nearly to the bottom of the vessel, as seen in Fig. 2, the liquid in this vessel serving to retain the sulphurous-acid vapors, while the pure oxygen gas rises to the top and passes off through the pipe K, from which it is collected into suitable vessels or reservoirs ready for use.

Instead of the pipes D and I being composed entirely of platinum, those portions which are at such a distance from the retort E as not to be exposed to the heat may be of glass, if preferred, a saving being thus effected.

It will be seen that the metal of which the pipes D I are composed—viz., platinum—is particularly adapted for the purpose, as it will withstand an immense amount of heat, and is not affected by sulphuric acid, and as no glass retort or porcelain pipes are used, the apparatus is not liable to be easily injured or deranged.

By my improved method, above described, I am enabled to manufacture pure oxygen gas at about one-twentieth of the cost at which it has heretofore been produced, thus effecting an immense saving where large quantities are used.

Claim.

What I claim as my invention, and desire to secure by Letters Patent, is—

The within-described apparatus for generating oxygen gas, constructed and operating substantially as set forth.

BEN. R. SMITHSON.

Witnesses:
P. E. TESCHEMACHER,
N. W. STEARNS.